United States Patent [19]

Kuga et al.

[11] Patent Number: 5,736,969
[45] Date of Patent: Apr. 7, 1998

[54] THREE-DIMENSIONAL IMAGE REPRODUCING APPARATUS

[75] Inventors: Kaeko Kuga; Takuzo Uemura, both of Kyoto, Japan

[73] Assignee: Rohm Co., Ltd., Kyoto, Japan

[21] Appl. No.: 350,002

[22] Filed: Nov. 29, 1994

[30] Foreign Application Priority Data

Nov. 30, 1993 [JP] Japan ................................. 5-299290

[51] Int. Cl.$^6$ ................................................ G09G 5/00
[52] U.S. Cl. ........................... 345/6; 239/18; 345/151
[58] Field of Search ........................... 239/16, 17, 211, 239/18, 20; 40/411, 412, 449; 345/6, 151; 348/51, 55, 57, 58

[56] References Cited

U.S. PATENT DOCUMENTS

| | | | |
|---|---|---|---|
| 3,077,816 | 2/1963 | Hirsch | 348/51 X |
| 3,568,927 | 3/1971 | Scurlock | 239/17 |
| 3,640,463 | 2/1972 | Kawamura et al. | 239/17 |
| 4,094,464 | 6/1978 | Kawamura et al. | 239/211 X |
| 4,294,406 | 10/1981 | Pevnick | 239/211 X |
| 4,323,920 | 4/1982 | Collender | 348/51 |
| 4,470,044 | 9/1984 | Bell | 348/51 X |
| 4,719,482 | 1/1988 | Hora | 348/57 X |
| 5,365,643 | 11/1994 | Fujimoto | |

FOREIGN PATENT DOCUMENTS 59-18932   1/1984   Japan.

OTHER PUBLICATIONS

Japan Reference, displaying the construction of a focusing servo mechanism, no translation.

*Primary Examiner*—Regina Liang
*Attorney, Agent, or Firm*—Nikaido Marmelstein Murray & Oram LLP

[57] ABSTRACT

A three-dimensional image reproducer receives a video signal including three-dimensional information including X and Y information constituting a plane and Z information constituting a depth. This apparatus causes particles to fall with respect to one line. The line from which the particles fall is changed in the Z direction based on the Z information. A light source generates a light beam toward the falling particle based on a video signal. The generated light beam is scanned in the X and Y directions. The focal point of the light beam is controlled to move in the Z direction in synchronism with the change of the line from which the particles fall. The image formed by the particles is viewed as a three-dimensional image if viewed from the Z direction.

3 Claims, 3 Drawing Sheets

THREE-DIMENSIONAL IMAGE REPRODUCING APPARATUS

BACKGROUND OF THE INVENTION

1. Field of the Invention

The present invention relates to a three-dimensional image reproducing apparatus.

2. Description of the Prior Art

For example, a conventional method to view a three-dimensional color image is that a viewer wears special glasses such as polarizing shutter glasses to view a color image on the display screen of a color television reproducing apparatus.

However, this method is defective not only since it is necessary for the viewer to wear the glasses but also since it is impossible for a number of people to simultaneously view the three-dimensional image if enough number of pairs of glasses are not prepared. In any case, according to the conventional method, it is impossible to view color three-dimensional images in a natural way.

SUMMARY OF THE INVENTION

An object of the present invention is to provide a three-dimensional image reproducing apparatus with which a plurality of persons can simultaneously view a three-dimensional image in a natural way without any need for special glasses.

A three-dimensional image reproducing apparatus of the present invention is provided with: signal processing means for receiving and processing a video signal including three-dimensional information including X information and Y information constituting a plane and Z information constituting a depth; particle releasing means for releasing a particle such that the particle falls down with respect to one line; particle fall controlling means for changing a line from which the particle falls in a Z direction based on the Z information of the three-dimensional information; light beam generating means for generating a light beam toward the falling particle based on a video signal; scanning means for scanning the generated light beam in an X direction and in a Y direction; and focal point controlling means for controlling a focal point of the light beam to move in the Z direction in synchronism with the change of the line from which the particle falls.

In such an arrangement, an image is reproduced by successively irradiating a plurality of particles as dots within an X-Y plane constituted by the particles falling from a certain line with a light beam based on a video signal. Since the irradiated particles glare and the particles not irradiated do not glare, a shaded image is obtained. When scanning by the light beam in the X and Y directions is completed with respect to the X-Y plane associated with this line, the same scanning is performed with respect to the next line decided by the Z information. By continuously performing such an operation, the image realized by the particles is viewed as a three-dimensional image.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
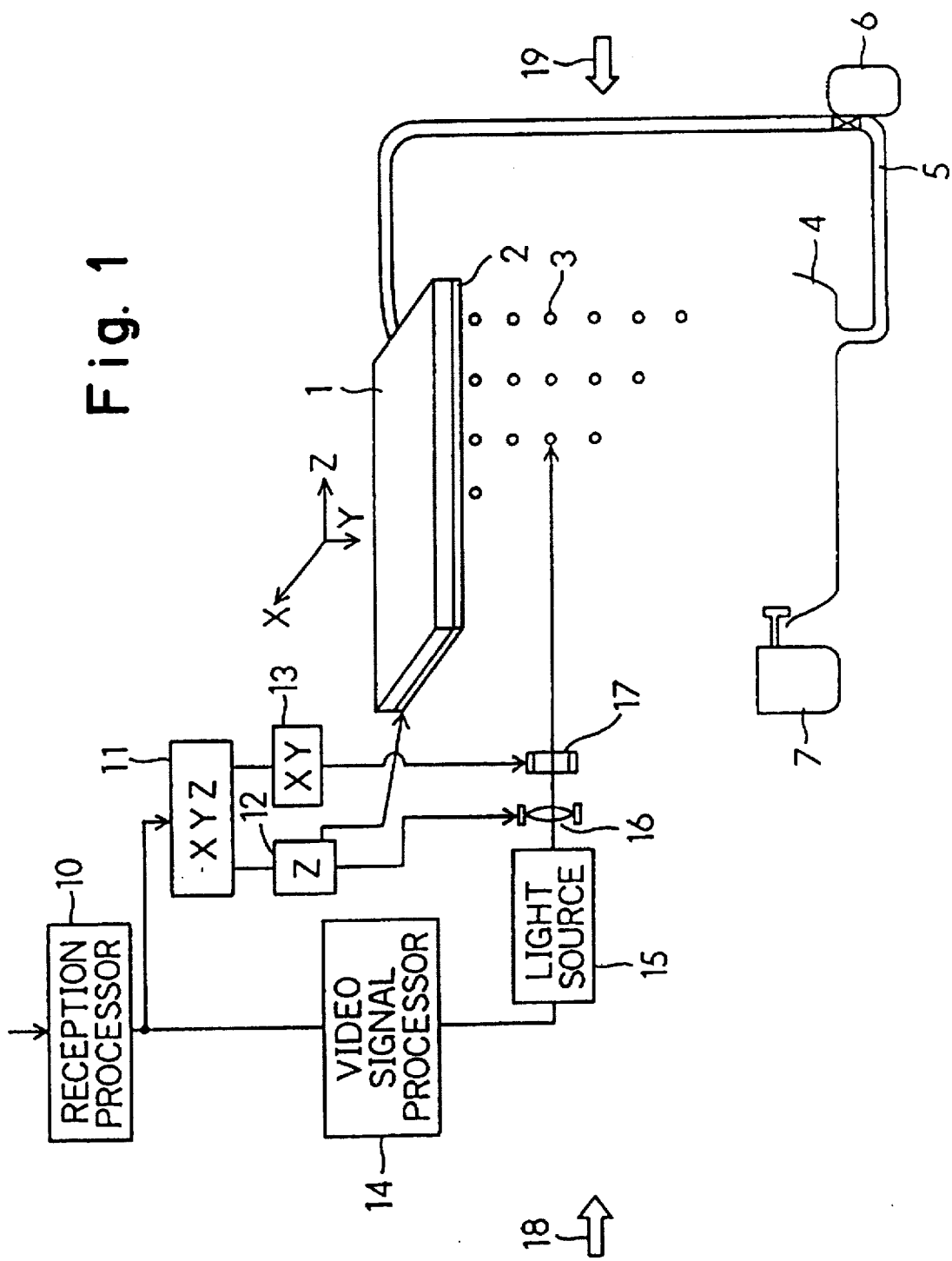
FIG. 1 is a schematic view of a three-dimensional image reproducer embodying the present invention.
Figure 2:
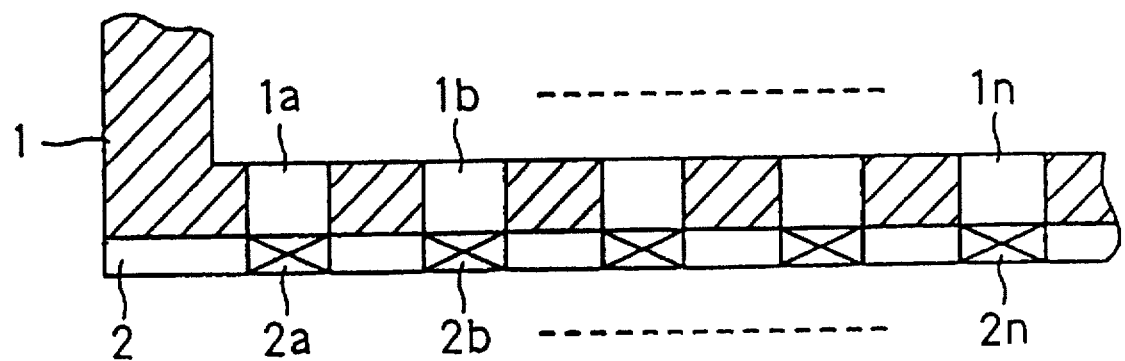
FIG. 2 is a cross-sectional view showing the mechanism of the fall of particles.

Hereinafter, the present invention will be described with reference to an embodiment shown in the drawings. Referring to FIG. 1, reference numeral 1 represents a thin plate form particle holder for storing water used as particles therein. On the under surface of the holder 1, an electrically driven shutter portion 2 is attached. On the shutter portion 2, shutter devices 2a, 2b, . . . , 2n are located at positions corresponding to holes 1a, 1b, . . . , 1n formed in the under surface of the holder 1. The shutter devices 2a, 2b, . . . , 2n are electrically opened and closed at a high speed (see U.S. Pat. No. 5,365,643)

The holes 1a, 1b, . . . , 1n and the shutter devices 2a, 2b, . . . , 2n are aligned regularly in a large number. The shutter devices aligned in the X direction operate simultaneously. The shutter devices are opened and closed at a high speed in order that water falls down through the shutter devices in drops. That is, the shutter devices are opened and closed at a speed high enough to form water into a drop. U.S. Pat. No. 5,365,643 discloses a device for releasing liquid ink particles and is an example of a shutter device.

Figure 3:
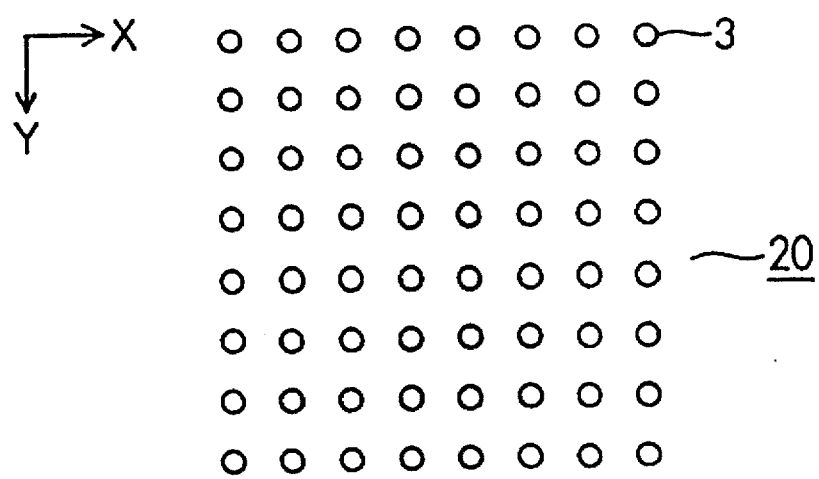
FIG. 3 shows a screen formed by falling particles.

Referring to FIG. 3, there is shown an X-Y plane constituted by drops 3 falling from one line. This plane forms a screen 20. A plurality of such screens 20 are formed in the Z direction. Instead of the water drops, another material may be used as the particles. The particles having fallen down are collected in a collector 4, and returned by a pump 6 through a tube 5 to the holder 1 located above. Since the water decreases in amount while being repeatedly used, a supplier 7 is prepared.

Reference numeral 10 represents a reception processor which receives and processes a video signal. The video signal includes three-dimensional information including X information, Y information and Z information. Here, the Z information is information on the depth. The video signal having such three-dimensional information on positions can be obtained, for example, by a three-dimensional camera.

The video signal from the reception processor 10 is further processed by a video signal processor 14 to drive a light source 15. As the light source 15, a semiconductor laser or a light emitting diode (LED) is used. Reference numeral 11 represents a detecting circuit which detects the X, Y and Z information from the video signal. Reference numeral 12 represents a Z separating circuit. Reference numeral 13 represents an X and Y separating circuit.

A light beam emitted from the light source 15 advances in the Z direction through a lens 16. Reference numeral 17 is a scanning means which scans the light beam in the X and Y directions. The scanning means is controlled based on X and Y signals from the X and Y separating circuit 13 (see Japanese Laid-Open Pat. No. 59-18932). A Z signal output from the Z separating circuit 12 moves the lens 16 backward and forward to obtain an in-focus condition with respect to a target screen (i.e. a focusing servo mechanism). Here, the image is viewed from the direction of arrow 18. In this embodiment, the left side of FIG. 1 is the front side and the right side thereof is the rear side. The image may be viewed in the direction of arrow 19. In that case, the right side is the front side and the left side is the rear side.

A three-dimensional image reproducing operation in this apparatus will be described. First, of the lines constituted by the holes 1a, 1b, . . . . , 1n for dropping the particles, the innermost line is opened and closed at a high speed by the shutter devices 2. Consequently, water drops sequentially fall down in the Y direction as shown in FIG. 3 to form the screen 20. When the first drop reaches a predetermined point of fall, a light beam intensity-modulated by a video signal is released from the light source 15 and scanned in the X and Y directions by the scanning means 17. That is, similar to electron beams, emitted by electron guns, which are scanned using horizontal and vertical deflection coils, the optical elements of Japanese Laid-Open Pat. No. 59-18932 can be used as a means to deflect the path of a light beam such that a light beam can be scanned. Thereby, an image is reproduced on the innermost screen.

Then, the line from which the water drops fall is changed from the innermost line to a line one line on this side of the innermost line, and another screen 20 is formed. At that time, the innermost screen formed first and on which an image is formed may be regarded as having substantially disappeared since the water drops constituting the screen fall down beyond a predetermined range.

An image is also formed on another screen. Then, an image is formed on each of the screens sequentially formed in this manner. When the image formation on the forefront screen is completed, the operation returns to the innermost line to repeat the formation of screens and images. The image thus formed is viewed by the viewer as a three-dimensional image. Since the position of the screen continuously varies in the Z direction, the position of the lens 16 in the Z direction is controlled so that the focal point of the light beam varies accordingly.

Figure 4:
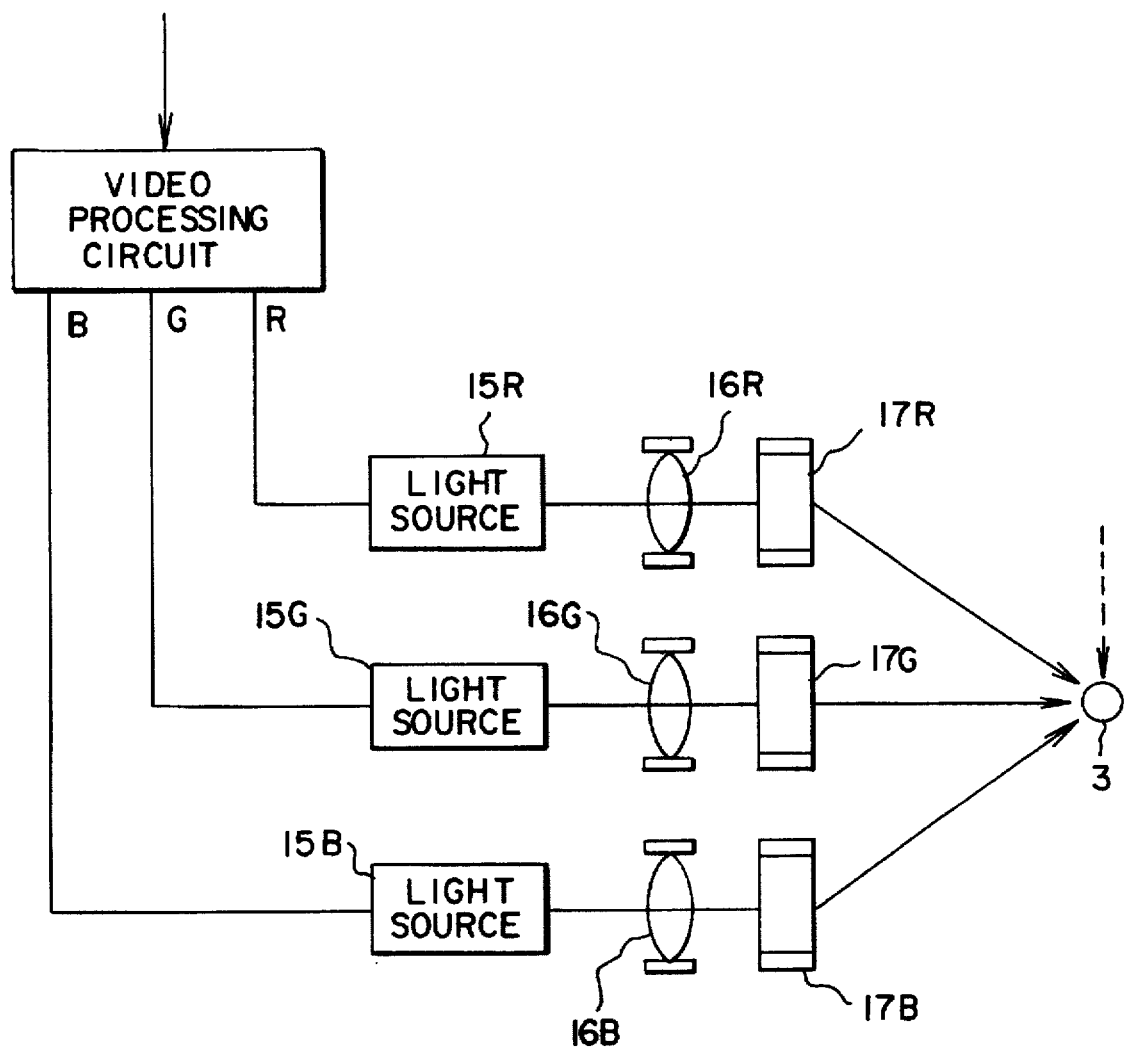
FIG. 4 shows another embodiment.

While the above-described embodiment is a three-dimensional image reproducer for reproducing a mono color image, to realize a three-dimensional image reproducer for reproducing a color image, three light sources each emitting a light beam are provided as shown in FIG. 4 . The video signal processor 14 generates red, green and blue color signals, and the color signals control the corresponding light sources. When the three light sources do not generate red, green and blue light beams, three kinds of particles are used and dropped which glisten in red, green and blue, respectively, when light beams irradiate them. In this case, the sizes of the three kinds of particles are different from one another in order that they can be selectively collected in the collector 4.

While in the above-described embodiment, a case where the line (therefore, screen) is changed from the innermost one to the forefront one, the line may be changed from the forefront one to the innermost one. When the line is changed backward and forward every time based on the Z information instead of the above-described manners, a more realistic three-dimensional image is obtained. Specifically, by changing the line frontward when the image moves from the rear to the front and changing the line backward when the image moves from the front to the rear, a three-dimensional image in accordance with the movement of the image is more realistically reproduced.

As described above, according to the present invention, three-dimensional images can be viewed simultaneously by a number of people without any need for special glasses.

Obviously, many modifications and variations of the present invention are possible in light of the above teachings. It is therefore to be understood that within the scope of the appended claims, the invention may be practiced other than as specifically described.

What is claimed is:

1. A three-dimensional image reproducing apparatus comprising:

signal processing means for receiving and processing a video signal including three-dimensional information including X information and Y information constituting a plane and Z information constituting a depth;

particle releasing means for releasing a particle such that said particle falls down with respect to one line;

particle fall controlling means for changing a line, from which the particle falls, in a Z direction based on the Z information of the three-dimensional information;

light beam generating means for generating a light beam toward the falling particle based on a video signal;

scanning means for scanning the generated light beam in an X direction and in a Y direction; and focal point controlling means for controlling a focal point of the light beam to move in the Z direction in synchronism with the change of the line from which the particle falls.

2. A three-dimensional image reproducing apparatus according to claim 1, further comprising collecting means for collecting a fallen particle to return it to a position where it is released.

3. A three-dimensional image reproducing apparatus according to claim 1, wherein said light beam generating means generates three light beams corresponding to color signals of three primary colors of red, green and blue, respectively.

* * * * *